United States Patent Office.

GEORGE G. NOAH, BOSTON, MASSACHUSETTS.

Letters Patent No. 104,190, dated June 14, 1870.

IMPROVEMENT IN THE MANUFACTURE OF PASTE.

The Schedule referred to in these Letters Patent and making part of the same.

To all whom it may concern:

Be it known that I GEORGE G. NOAH, of Boston, in the county of Suffolk and Commonwealth of Massachusetts, have invented a new and improved Mode or Method of Making Paste; and I do hereby declare that the following is a full, and exact description thereof.

The nature of my invention consists in the addition of certain ingredients to the common article of paste, which ingredients in combination are intended to and do preserve the paste for any length of time, and give it greater adhesive power.

The common article of paste is usually made of wheat flour, alum, and water. It is desirable to so make paste that it will keep for any length of time, that is, keep from souring and moulding, and this my invention is intended to accomplish in a different way from what it ever was done before, and at the same time give the paste greater adhesive power. I know that one or two of the ingredients I use have been used before, but not in combination with each other, or with the other ingredients I use, but separately, and that is the reason why they have failed heretofore to preserve the paste, but by using the combination I have invented, the paste is kept from souring and molding, and is preserved perfectly and is greatly improved in its adhesive power.

My method of making my paste is as follows:

I take of wheat flour one hundred pounds; chloride of zinc, five pounds; alum, five pounds; bichloride of mercury, one ounce; and oil of cloves, one-half ounce.

I then mix with cold water in such proportions as to make the paste of proper consistency, when cooked by steam, or otherwise.

I also make use of other salts of zinc, such as the sulphate and ascetate, in the place of the chloride of zinc, and also use in the place of the said chloride of zinc, for special purposes, the chloride of copper and the sulphate, and all of these I use as I do the chloride of zinc, in combination with wheat flour, bichloride of mercury, and oil of cloves and alum, and I vary the proportions in certain cases, as may seem to be required.

The objection to the use of corrosive sublimate in this composition is met by the fact that the gluten of the flour neutralizes the poisonous effect of the corrosive sublimate.

I do not intend to confine myself to the exact proportions herein described, but claim the use of substantially the same proportions.

What I claim, and desire to secure by Letters Patent, is—

The formation of a paste made with the chloride of zinc, sulphate of zinc, ascetate of zinc, or with the chloride of copper, sulphate of copper, combined with the bichloride of mercury, oil of cloves, alum, and wheat flour, in substantially the proportions described.

GEORGE G. NOAH.

Witnesses:
J. D. VANDUZEE,
B. C. MOULTON.